US009846708B2

(12) United States Patent
Spielberg (10) Patent No.: US 9,846,708 B2
(45) Date of Patent: Dec. 19, 2017

(54) SEARCHING OF IMAGES BASED UPON VISUAL SIMILARITY

(71) Applicant: International Business Machines Corporation, Armonk, NY (US)

(72) Inventor: Anthony C. Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 14/137,756

(22) Filed: Dec. 20, 2013

(65) Prior Publication Data

US 2015/0178317 A1  Jun. 25, 2015

(51) Int. Cl.
*G06K 9/00* (2006.01)
*G06F 17/30* (2006.01)
*G06K 9/62* (2006.01)

(52) U.S. Cl.
CPC .. *G06F 17/30256* (2013.01); *G06F 17/30265* (2013.01); *G06K 9/6202* (2013.01)

(58) Field of Classification Search
CPC ........... G06F 17/3025; G06F 17/30256; G06F 17/30259; G06F 17/30262; G06F 17/30265
See application file for complete search history.

(56) References Cited

U.S. PATENT DOCUMENTS

| 6,175,829 | B1* | 1/2001 | Li ..................... G06F 17/30247 |
| 6,584,221 | B1* | 6/2003 | Moghaddam ..... G06F 17/30256 382/165 |
| 6,853,389 | B1* | 2/2005 | Ikeda ................ G06F 17/30259 345/156 |
| 7,043,474 | B2* | 5/2006 | Mojsilovic ........ G06F 17/30256 |
| 8,209,330 | B1 | 6/2012 | Covell et al. |
| 2007/0031034 | A1* | 2/2007 | Rising ................ G06F 17/3025 382/170 |
| 2009/0313239 | A1 | 12/2009 | Wen et al. |
| 2010/0131499 | A1 | 5/2010 | van Leuken et al. |
| 2010/0205202 | A1 | 8/2010 | Yang et al. |

OTHER PUBLICATIONS

Xiaoou, T. et al.; "IntentSearach: Catruing User Intention for One-Click Internet Image Search"; IEEE Transactions on Pattern Analysis and Machine Intelligence; vol. 34, No. 7, pp. 1342-1353, Jul. 2012.
Xiaogang, W. et al.; "Query-specific visual semantic spaces for web image re-ranking", 2011 IEEE Conference on Computer Vision and Pattern Recognition (CVPR); pp. 857-864; 2011.

(Continued)

*Primary Examiner* — Stephen R Koziol
*Assistant Examiner* — Timothy Choi
(74) *Attorney, Agent, or Firm* — Noah Sharkan; Gregory K. Goshorn; Greg Goshorn, P.C.

(57) ABSTRACT

Provided are techniques for selecting an image for comparison with a plurality of images; specifying one or more visual criterion for searching the plurality of images, wherein the visual criteria are based upon a visual similarity between the image and the plurality of images; searching the plurality of images based upon the criteria to identify a subset of the plurality of images that meet a threshold with respect to the visual similarity; and displaying in a graphical user interface the subset of images.

10 Claims, 7 Drawing Sheets

(56) References Cited

OTHER PUBLICATIONS

Lmaati, EA. et al.; "A visual similarity-based 3D search engine"; Data Science Journal, vol. 8, pp. 78-87, Oct. 24, 2009.
IBM; "A Method and Apparatus of Automatically Assigning Images to Plain Text in Searching Results"; http://priorartdatabase.com/IPCOM/000193081; Feb. 10, 2010.
Smola, A. et al.; "Method and System for Searching a Collection of Objects based on Similarity and Ranking"; http://priorartdatabase.com/IPCOM/000198735; Aug. 13, 2010.

* cited by examiner

SEARCHING OF IMAGES BASED UPON VISUAL SIMILARITY

FIELD OF DISCLOSURE

The claimed subject matter relates generally to computer search algorithms and, more specifically, to techniques to provide more flexibility when searching images.

BACKGROUND OF THE INVENTION

Most Internet search providers enable a user to search for images based upon the matching of a particular attribute to a target image. For example, if a user inputs a target image to the search engine, the search engine returns a set of images based upon a few simple attributes such as color or black-and-white, pixel dimensions or keywords. Typically, such attributes may only be searched if the images have been indexed with respect to those attributes. However, such techniques do not have the ability to influence the search engine's internal searching algorithms with respect to more complex attributes and do not have the ability to search unindexed image repositories.

SUMMARY

Provided are techniques for selecting an image for comparison with a plurality of images; specifying one or more visual criterion for searching the plurality of images, wherein the visual criteria are based upon a visual similarity between the image and the plurality of images; searching the plurality of images based upon the criteria to identify a subset of the plurality of images that meet a threshold with respect to the visual similarity; and displaying in a graphical user interface the subset of images.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, image search results could be improved by guiding a search engine's results with respect to visual features of images. Such features include, but are not limited to, overall composition, composition of a selected region of an image, overall color of the image, color of a selected region of the image, overall luminosity of the image, the luminosity of a selected region of the image and combinations of these features.

Figure 1:
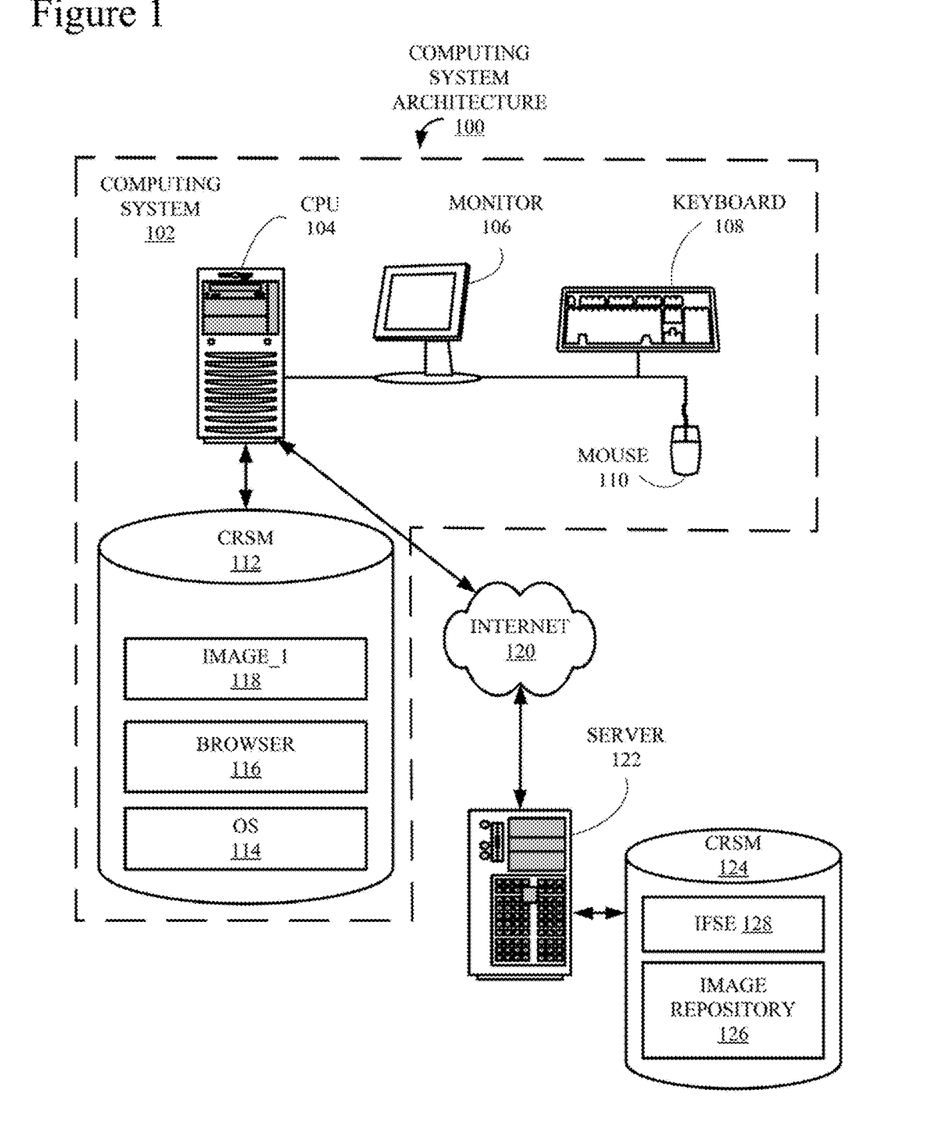
FIG. 1 is a computing system architecture that may implement the claimed subject matter.

Turning now to the figures, FIG. 1 is a block diagram of one example of a computing system architecture 100 that may incorporate the claimed subject matter. A computing system 102 includes a central processing unit (CPU) 104, coupled to a monitor 106, a keyboard 108 and a pointing device, or "mouse," 110, which together facilitate human interaction with computing system 100 and computing system 102. Also included in computing system 102 and attached to CPU 104 is a computer-readable storage medium (CRSM) 112, which may either be incorporated into computing system 102 i.e. an internal device, or attached externally to CPU 104 by means of various, commonly available connection devices such as but not limited to, a universal serial bus (USB) port (not shown). CRSM 112 is illustrated storing an operating system (OS) 114 and a browser 116. Although not shown, browser 116 would typically include a graphical user interface (GUI). Also stored on CRSM 112 is an image. i.e., an image_1 118, which is used throughout the Specification merely as an example of an image that might be used as the basis of a search in accordance with the disclosed technology. It should be noted that a typical computing system would include more than the illustrated components but for the sake of simplicity only a limited number of components are shown.

Computing system 102 and CPU 104 are connected to the Internet 120, which is also connected to a server computer, or simply "server," 122. Although in this example, computing system 102 and server 122 are communicatively coupled via the Internet 120, they could also be coupled through any number of communication mediums such as, but not limited to, a local area network (LAN) (not shown). Like computing system 102, server 122 would typically include a CPU, a monitor, a keyboard and a pointing device. Server 122 is coupled to a CRSM 124, which stores an image repository 126. Although shown on server 122, image repository 126 may be stored on almost any device accessible by server 122, either locally, remotely or in multiple location. In other words, image repository 126, which is used as an example throughout the Specification, is one simple example among many possible types of sources of images that may be processed in accordance with the claimed subject matter. Also stored on CRSM 124 is an Image Feature Search Engine (IFSE) 128, which implements the claimed subject matter. IFSE 128 provides all the standard search engine functionality for searching image repository 126 and, in addition, provides the image searching features of the claimed subject matter. IFSE 128 is explained in more detail below in conjunction with FIGS. 2-7. It should be noted there are many possible computing system configurations, of which architecture 100 is only one simple example.

Figure 2:
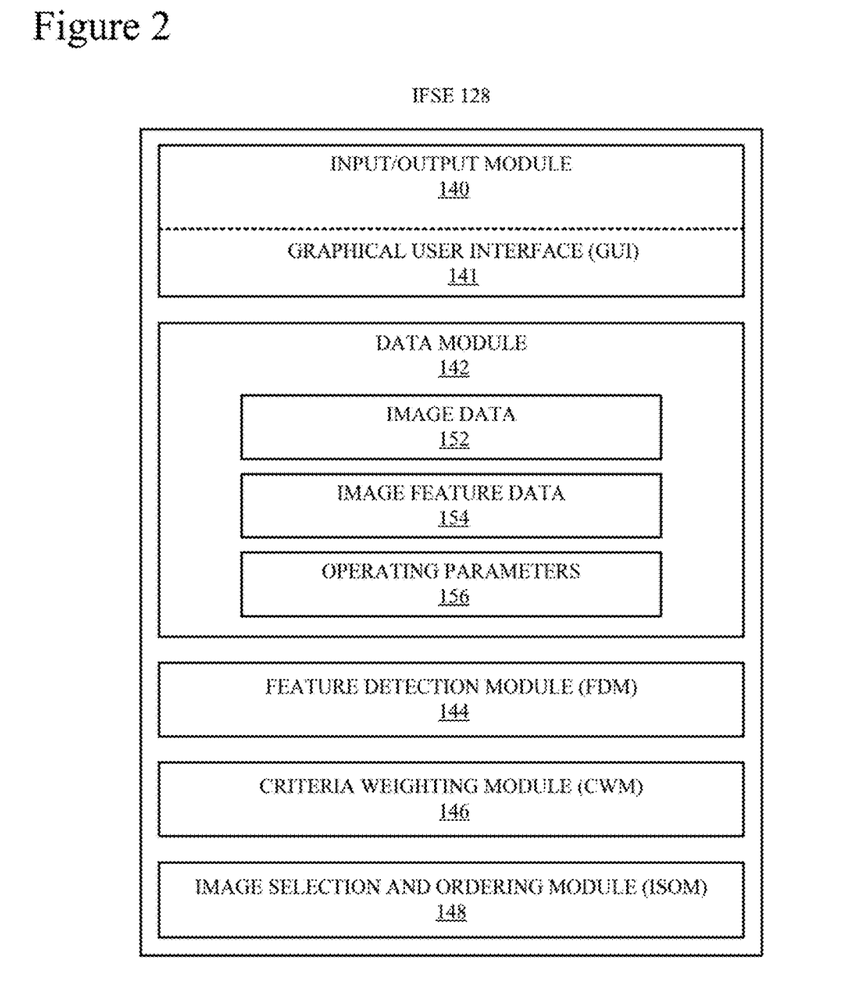
FIG. 2 is a block diagram of an Image Feature Search Engine (IFSE) that may implement aspects of the claimed subject matter.

FIG. 2 is a block diagram of IFSE 128, introduced above in FIG. 1, is greater detail. IFSE 128 includes an input/output (I/O) module 140, a data module 142, a Feature Detection Module (FDM) 144, a Criteria Weighting Module (CWM) 146 and an Image Selection and Ordering module (ISOM) 148. For the sake of the following examples, IFSE 128 is assumed to be associated with logic stored on. CRSM 124 (FIG. 1) and executed on one or more processors (not shown) of server 122 (FIG. 1). It should be understood that the claimed subject matter can be implemented in many types of computing systems and data storage structures but, for the sake of simplicity, is described only in terms of computing system 102, server 122 and system architecture 100 (FIG. 1). Further, the representation of IFSE 128 in FTC. 2 is a logical model. In other words, components 140, 142, 144, 146 and 148 may be stored in the same or separates tiles and loaded and/or executed within system 100 either as a single system or as separate processes interacting via any available inter process communication (IPC) techniques.

I/O module 140 handles any communication IFSE 128 has with other components of architecture 100. Included in I/O module is a graphical user interface (GUI) 141, which enables users and administrators of IFSE 128 to easily interact with and define the functionality of IFSE 128.

Data module 142 is a data repository for information that IFSE 128 requires during normal operation. Examples of the types of information stored in data module 142 include image data 152, image feature data 154 and operating parameters 156. Image data 152 stores information that enables IFSE 128 to locate and access image repositories such as image repository 126 (FIG. 1). Image feature data 154 stores information on the various types of features that IFSE 128 may detect and search. In other words, the characteristics of features that make any particular feature is described, or "modeled." in a manner that enables IFSE 128 to detect and therefore search a plurality of images for those particular features. Operating parameters 156 includes information on various administrative preferences that have been set. For example, an administrator may specify thresholds for selection of images, default values for the number of images selected and the location of administrative log files.

FDM 144 is responsible for identifying the features modeled in image feature data 154 within the images identified in image data 152 to determine either the presence or the degree that a particular feature is present in an image. As explained in more detail below, a user of IFSE 128 selects the particular feature(s) that are employed in any particular search. CWM 146 collects the data generated by FDM 144 about the presence or degree that a particular feature is present, calculates a feature score for each image based upon assigned weights to the selected feature and compiles an image score for each image.

ISOM 148 evaluates each image based upon the corresponding image score to determine whether or not the image should be included in a result set transmitted to the user initiated the search. In addition, ISOM 148 may order the result set based upon the image scores. Components 142, 144, 146, 148, 152, 154 and 156 are described in more detail below in conjunction with FIGS. 3-7.

Figure 3:
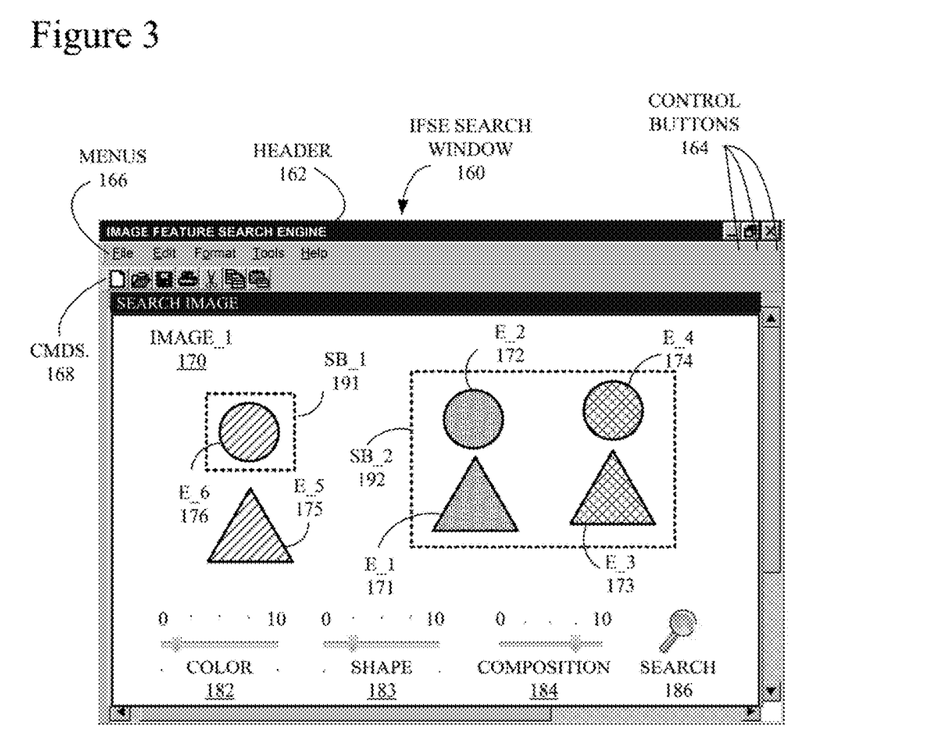
FIG. 3 is an example of an IFSE search window employed in conjunction with the IFSE of FIG. 2.

FIG. 3 is an example of an IFSE search window 160 employed in conjunction with IFSE 128 of FIGS. 1 and 2. Search window 160 is used as an example throughout the remainder of this Description. In this example, search window 160 displayed on monitor 106 (FIG. 1) by a GUI (not shown) associated with browser 116 (FIG. 1) in response to a connection with IFSE 128 on server 122 (FIG. 1).

A Header 162 along the top of window 160 displays the name of a corresponding application that generates window 160, i.e., "Image Feature Search Engine." A certain amount of control, such as terminating execution and maximizing or minimizing window 160, may be exercised when a user positions a cursor (not shown), using mouse 110 (FIG. 1), over any of several control buttons 164. Several menus 166, such as "File," "Edit," "Format," "Tools" and "Help" are displayed. In addition, several commonly used commands, such as New File, Retrieve File, Save, Print and so on are displayed as Command Buttons (Cmds.) 168. Those with skill in the relevant arts will be familiar with the concepts of windows, control buttons, menus and command buttons.

Search window 160 is displaying an image, i.e., an image_1 170, which is used as an example of an image that a user may want to match with respect to selected parameters in accordance with the claimed subject matter. Within image_1 170 are six (6) identified image elements, or simply "elements," i.e., an E_1 171, an E_2 172, an E_3 173, an E_4 174, an E_5 175 and an E_6 176. Both, image 170 and elements 171-176 are merely used as examples to describe the disclosed technology. Each elements exhibit a particular pattern, which are used to represent different colors. In other words, E_1 171 and E_2 172 are the same color; E_3 173 and E_4 174 are the same color, which is a different color than E_1 171 and E_2 172; and E_5 175 and E_6 176 are the same color, which is a different color than that of either E_1 171 and E_2 172 or E_3 173 and E_4 174.

Elements 171-176 are also a variety of shapes, which in this example include a triangular shape of elements 171, 173 and 175 and a circular shape of elements 172, 174 and 176. It should be noted that the particular colors and shapes represented in FIG. 3 are merely examples for the sake of description and that the disclosed techniques are applicable to many shapes, colors and other characteristics of image elements in addition to those illustrated.

Below image_1 170 are three (3) slide bars, i.e., a "Color" slide bar 182, a "Shape" slide bar 183 and a "Composition" slide bar 184. The specific names for slide bars 182-184 represent particular image features that may be searched for in collections of images. It should be understood that color, shape and composition are only examples and that there are many different features and types of features that may be incorporated into the disclosed technology. For example, images may be search on the basis of luminosity. In the following examples, "shape" refers to the shape of smaller elements which when grouped together form the entire image being searched. Composition refers to larger patterns in the image, i.e., patterns which are formed by both the shapes and the relative positions of the smaller elements.

Each slide bar 182-183 has a scale, which in the example goes from '0' to '10'. The positions of markers within slide bars 182-184 indicate the particular level, or "weight," between '0' and '10' at which each slide bar 182-184 is set. In accordance with the disclosed technology, image_1 170 is compared with other images, such as those in image repository 126 (FIG. 1), with features given more weight in proportion to the corresponding set level (see 350, FIG. 6). In this example, color slide bar 182 is set to a level of '2'; shape slide bar 183 is set to a level of '4' and composition slide bar 184 is set to a level of '8'. Therefore, in the resultant search of images 126, composition is given the most weight, color is given the least weight and shape is given a weigh between that of color and composition. Once a user has selected the desired weights, a search may be initiated by clicking on a search icon 186.

Also illustrated superimposed on image_1 170 are two search boxes, i.e., a SB_1 191 and a SB_2 192. Search boxes 191 and 192 enable a user to select a particular region, or "area," within image 170 to be the focus of a search. In other words, a user may select, using a search box, a subset of the elements 171-176 and request a criteria-based search based only upon the elements within the search box. Typically, only one search box would be superimposed on image 170 at a time but SB_1 191 and SB_2 192 are used in subsequent figures to illustrate specific searches based upon two different sets of selected elements.

Figure 4:
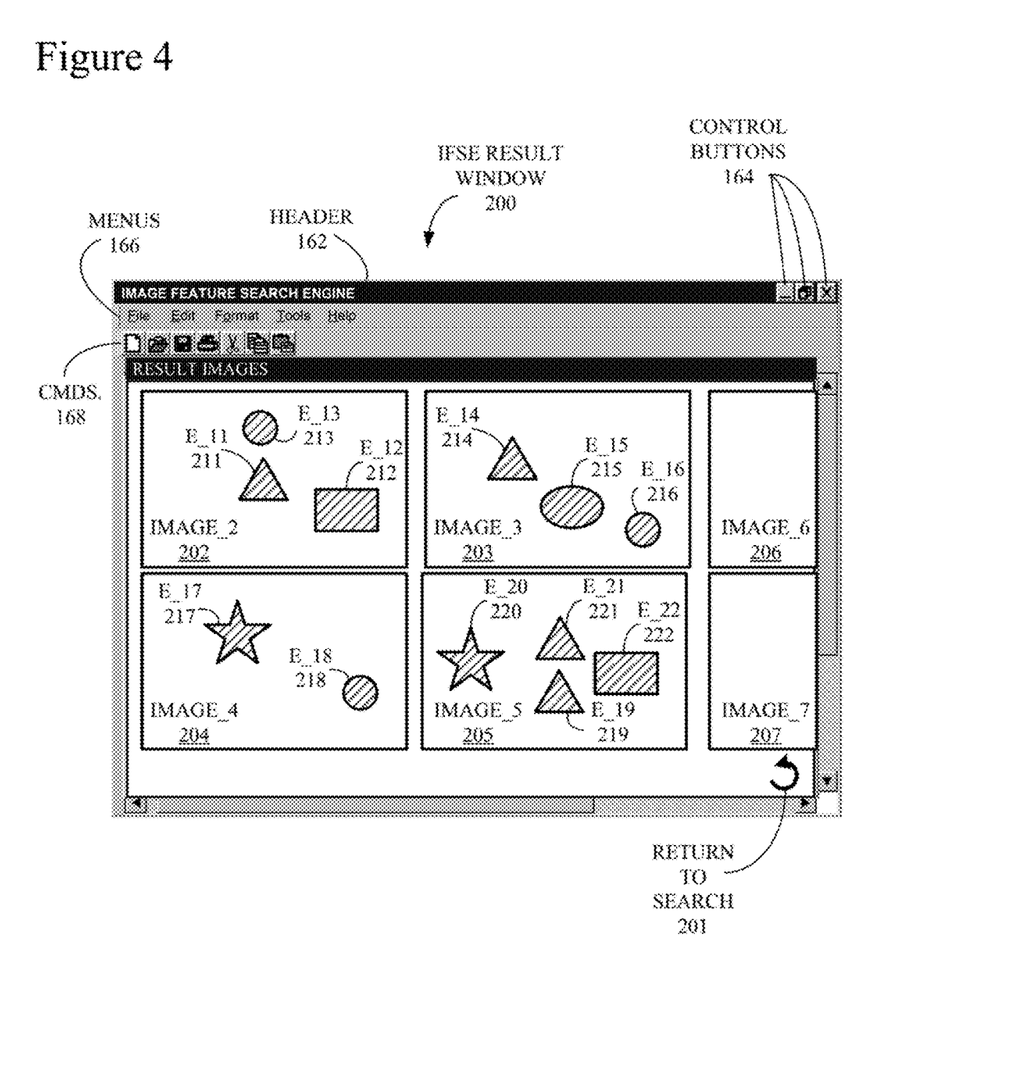
FIG. 4 is an example of an IFSE result window employed in conjunction with the IFSE of FIG. 2.

FIG. 4 is an example of an IFSE result window 200 employed in conjunction with the IFSE 128 of FIGS. 1 and 2. In this example, like search window 160 (FIG. 3), result window 200 is displayed on monitor 106 (FIG. 1) by a GUI of browser 116 (FIG. 1) and is the result of a user selecting an image, weights for particular features and clicking on search button 186 as described above in conjunction with FIG. 3. Like window 160, result window includes header 162, control buttons 164, menus 166 and commands 168.

In this example, a search based upon image_1 170 (FIG. 3) has resulted in the retrieval of six (6) images, i.e. an image_2 202, an image_3 203, an image_4 204, an image_5 205, an image_6 206 and an image_7 207. Images 206 and 207 do not fit entirely in window 200 so are partially obscured, i.e., they are not showing all their elements. Each of images 202-207 includes elements that correspond to selected elements 191-193 of image_1 170 selected in response to specified criteria. In result window 200, images 202-207 represent a selection on images from image repository 126 that include elements matching the color of E_6 176 (FIG. 3), which is selected by SB_1 191. In other word, in this example, to generate window 200, a user has drawn a box around E_6 176 using mouse 110 (FIG. 1), has positioned color bar 182 (FIG. 3) to a value of '10' and bars 183 and 184 (FIG. 3) at a value of '0' and clicked on search 186 (FIG. 1).

Image_2 202 includes three (3) elements, i.e., an E_11 211, E_12 212 and E_13 213, each of which is the same color as 176 but is not necessarily similar with respect to shape. In addition the overall composition of each of images 202 207 does not necessarily match the overall composition of the area of image_1 170 specified by SP_1 191. In a similar fashion, image_3 203 includes three (3) elements, i.e., an E_14 214, an E_15 215 and an E_16 216; image_4

204 includes two (2) elements, i.e., an E_17 217 and an E_18 218; and image_5 205 includes four (4) elements, i.e., an E_19 219, an E_20 229, and E_21 221 and E_22 222. In other words, each of the images 202-207 have been selected by IPSE 128 because they share the color value of the elements in SB_1 191. In this example, shape and composition have not been given weight.

A user may select one of images 202-207, click on a Return to Search button 201 and return to search screen 160 with the selected image replacing image_1 170 as the basis of a new search. In this example, clicking on button 201, without selecting one of images 202-207, returns the user to screen 160 with the original image_1 170 displayed so that the user may change parameters and search area and perform an addition search on image_1 170 using the changed parameters and areas. If the user clicks on one of images 202-207, search screen 160 is displayed with the clicked image 202-207 displayed so that the user may search for additional images based upon whichever image 202-207 has been selected.

Figure 5:
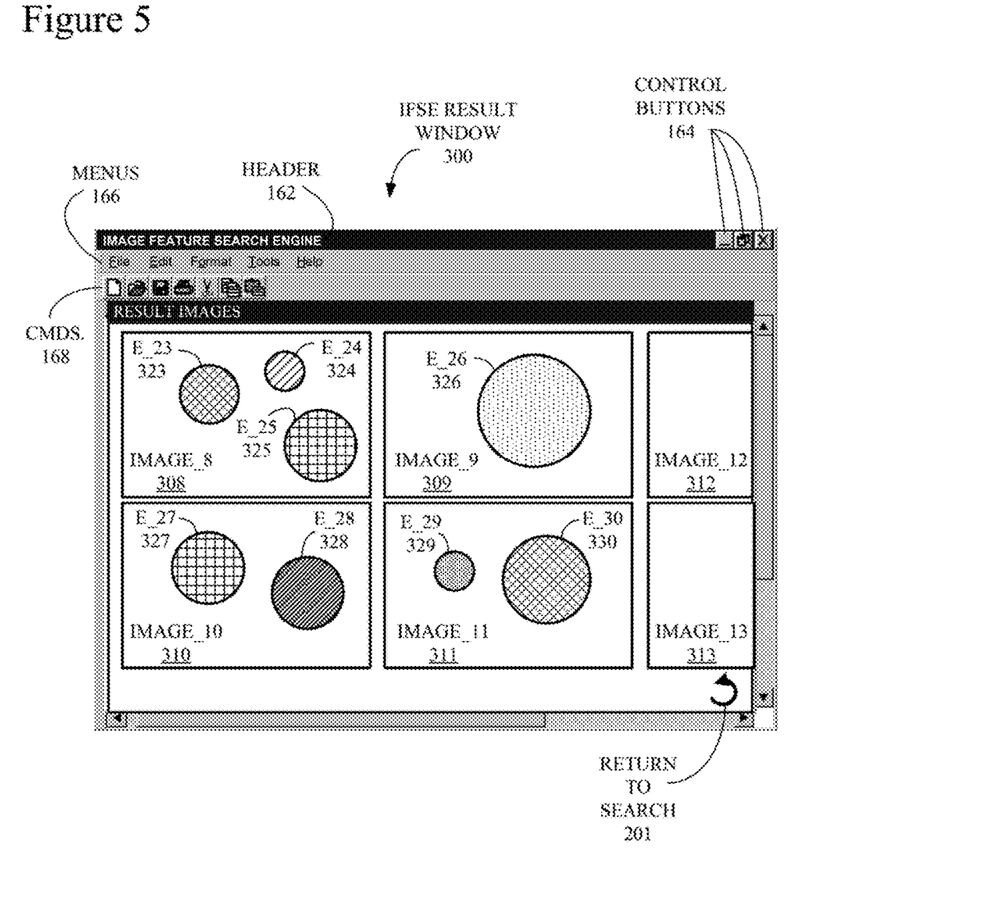
FIG. 5 is an example of a second IFSE result window employed in conjunction with the IFSE of FIG. 2.

FIG. 5 is an example of an IFSE result window 300 employed in conjunction with the IFSE 128 of FIGS. 1 and 2. In this example, like search window 160 (FIG. 3), result window 300 is displayed on monitor 106 (FIG. 1) by a GUI of browser 116 (FIG. 1) and is the result of a user selecting an image, weights for particular features and clicking on search button 186 as described above in conjunction with FIG. 3. Like window 160, result window includes header 162, control buttons 164, menus 166 and commands 168.

In this example, a search based upon image_1 170 (FIG. 3) has resulted in the retrieval of six (6) images, i.e. an image_8 308, an image_9 309, an image_10 310, an image_11 311, an image_12 312 and an image_13 313. Images 312 and 313 do not fit entirely in window 300 so are partially obscured, i.e., they are not showing all their elements. Each of images 308-313 includes elements that correspond to selected elements 191-193 (FIG. 3) of image_1 170 selected in response to specified criteria. In result window 300, images 202-207 represent a selection on images from image repository 126 that include elements matching the shape of E_6 176 (FIG. 3), which is selected by SB_1 191. In other word, in this example, to generate window 300, a user has drawn a box around E_6 176 using mouse 110 (FIG. 1), has positioned shape bar 183 (FIG. 3) at a value of '10' and bars 182 and 184 (FIG. 3) at a value of '0' and clicked on search 186 (FIG. 1).

Image_8 308 includes three (3) elements, i.e., an E_23 323, an E_24 324 and an E_25 325, each of which is the same shape as E_6 176 but is not necessarily similar with respect to color. In addition the overall composition of each of images 308-313 does not necessarily match the overall composition of the area of image_1 170 specified by SP_1 191. In a similar fashion, image_9 309 includes one (1) element, i.e., an E_26 326; image_10 310 includes two (2) elements, i.e., an E_27 327 and an E_28 328; and image_11 311 includes two (2) elements, i.e., an E_29 329 and E_30 330. In other words, each of the images 308-313 have been selected by IPSE 128 because they share the shape value of the elements in SB_1 191. In this example, color and composition have not been given weight.

Like result window 200, a user may select one of images 308-313, click on Return to Search button 201 and return to search screen 160 with the selected image replacing image_1 170 as the basis of a new search. In this example, clicking on button 201, without selecting one of images 308-313, returns the user to screen 160 with the original image_1 170 displayed so that the user may change parameters and search area and perform an addition search on image_1 170 using the changed parameters and areas. If the user clicks on one of images 308-313, search screen 160 is displayed with the clicked image 308-313 displayed so that the user may search for additional images based upon whichever image 308-313 has been selected.

Figure 6:
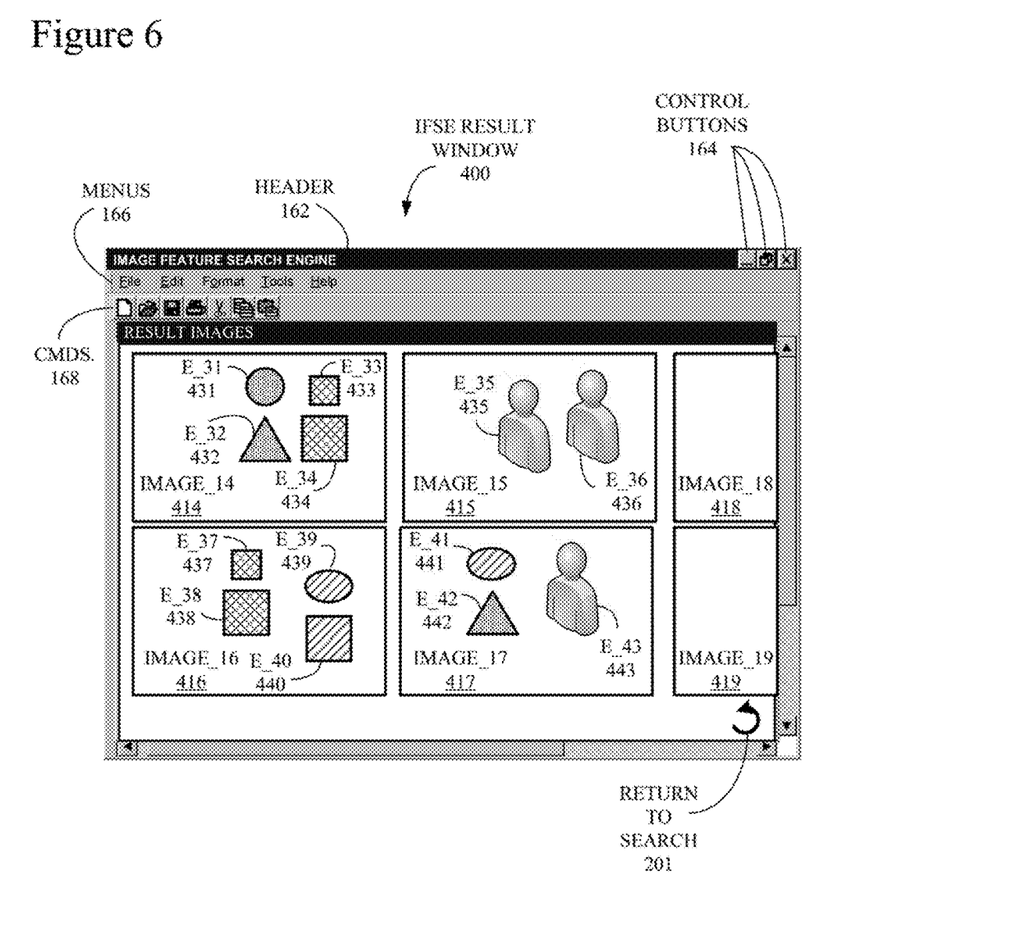
FIG. 6 is an example of a second IFSE result window employed in conjunction with the IFSE of FIG. 2.

FIG. 6 is an example of an IFSE result window 400 employed in conjunction with the IFSE 128 of FIGS. 1 and 2. In this example, like search window 160 (FIG. 3), result window 400 is displayed on monitor. 106 (FIG. 1) by a GUI of browser 116 (FIG. 1) and is the result of a user selecting an image, weights for particular features and clicking on search button 186 as described above in conjunction with FIG. 3. Like window 169, result window includes header 162, control buttons 164, menus 166 and commands 168.

In this example, a search based upon image_1 170 (FIG. 3) has resulted in the retrieval of six (6) images, i.e. an image_14 414, an image_15 415, an image_16 416, an image_17 417, an image_18 418 and an image_19 419. Images 418 and 419 do not fit entirely in window 400 so are partially obscured, i.e., they are not showing all their elements. Each of images 414-419 includes elements that correspond to selected elements 191-194 within SB_2 192 (FIG. 3) of image_1 170, selected in response to specified criteria. In result window 400, images 414-419 represent a selection on images from image repository 126 that include elements matching the composition of E_1 171 (FIG. 3), E_2 172 (FIG. 3), E_3 173 (FIG. 3) and E_4 174 (FIG. 3), which are selected by SB_2 192. In other word, in this example, to generate window 400, a user has drawn a box around elements 171-174 using mouse 110 (FIG. 1), has positioned shape bar 184 (FIG. 3) at a value of '10' and bars 182 and 183 (FIG. 3) at a value of '0' and clicked on search 186 (FIG. 3).

Like the elements 171-174 included in SP_2 192, image_14 414 includes four (4) elements, i.e., an E_31 431, an E_32 432, an E_33 433 and an E_34 434, each of which is arranged, or "composed," similarly to elements 171-174 but is not necessarily similar with respect to either color or shape. Image_15 415 only includes two (2) elements, i.e., an E_35 435 and an E_36 436. However, the composition of image_15 415 is similar to the composition of SB_2 192 in that a similar portion of the area of image_15 415 is covered. In other words, IFSE 128 has determined that each of elements 171 and 172 of image_1 170 occupy a certain position and area of SB_2 191 and identified a single element 435 that approximates this position and area. For example, IFSE 128 has equated elements 173 and 174 with element 436.

Image_16 416 includes four (4) elements, i.e., an E_37 437, an E_38 438, an F_39 439 and an F_40 440, each of which is arranged, or "composed," similarly to elements 171-174 but is not necessarily similar with respect to either color or shape. Image_17 417 includes three (3) elements, i.e., an E_41 441, an E_42 442 and an E_43 443, each of which in combination is arranged, or "composed," similarly to elements 171-174 but is not necessarily similar with respect to either color or shape.

Like with result window 200, a user may select one of images 414-419, click on Return to Search button 201 and return to search screen 160 with the selected image replacing image_1 170 as the basis of a new search. In this example, clicking on button 201, without selecting one of images 414-419, returns the user to screen 160 with the original image_1 170 displayed so that the user may change parameters and search area and perform an addition search on image_1 170 using the changed parameters and areas. If the user clicks on one of images 414-419, search screen 160 is displayed with the clicked image 414-419 displayed so that the user may search for additional images based upon whichever image 414-419 has been selected. It should be understood that although result windows 200, 300 and 400 display results corresponding to a single search criterion, i.e., color, shape or composition, the disclosed technology may also combine search criterion with weights corresponding to each criterion to score images (see process 500, FIG. 7).

Figure 7:
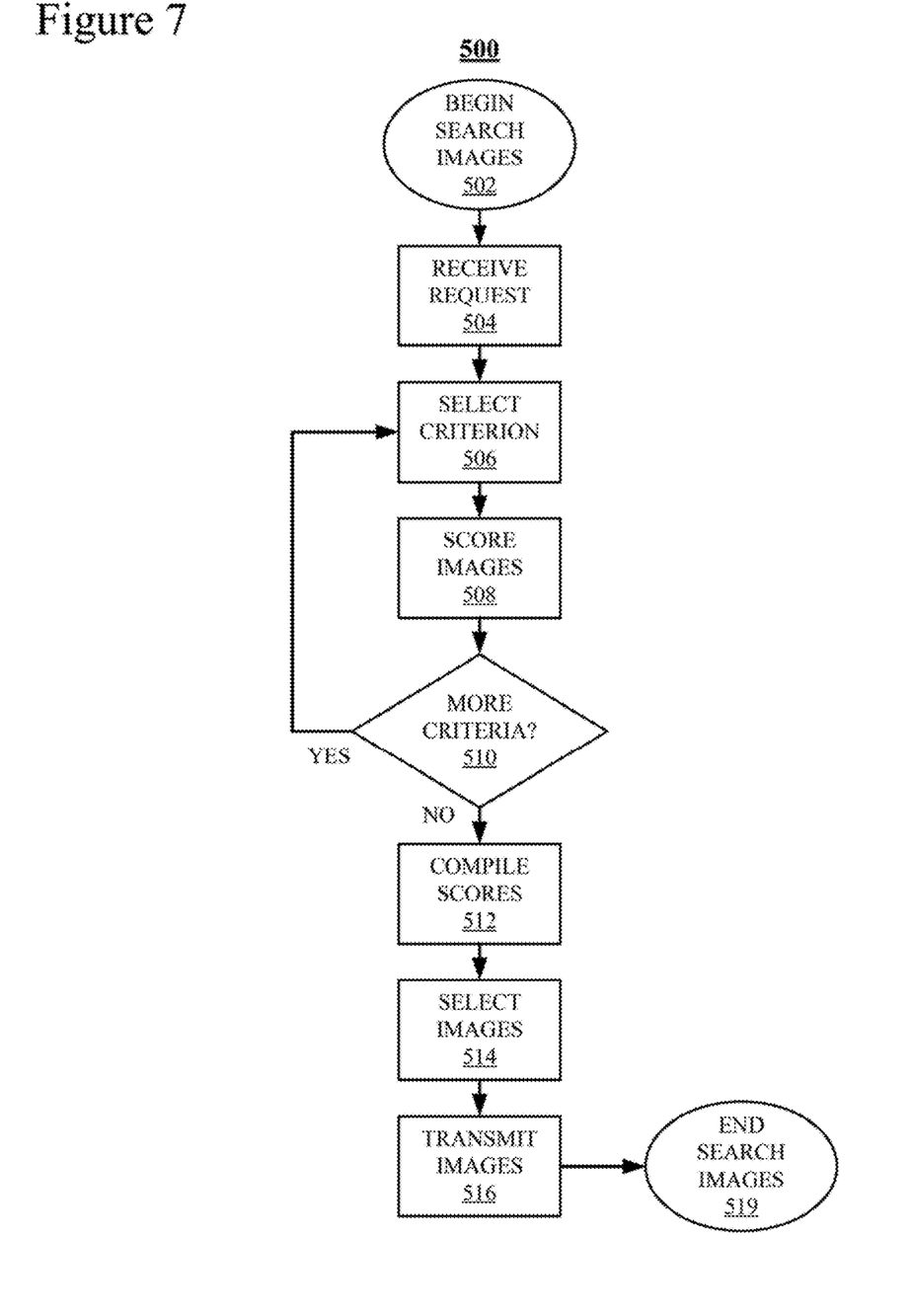
FIG. 7 is a flowchart of one example of a Search Images process that may implement aspects of the claimed subject matter.

FIG. 7 is a flowchart of one example of a Search Images process 500 that may implement aspects of the claimed subject matter. In this example, logic associated with process 500 is stored on CRSM 124 (FIG. 1) in conjunction with IFSE 128 (FIGS. 1 and 2) and executed on one or more processors (not shown) of server 122 (FIG. 1). Typically, process 500 is initiated when, in this example, a user on computing system 102 has specified one or more weights for visual criteria, represented by slide bars 182-184 (FIG. 3), on search screen 160 (FIG. 3), selected a search area such as search areas 191 and 192 (FIG. 3), if desired, and clicked on search button 186 (FIG. 3). This transmits a request to IFSE 128. Then, IFSE 128 searches and responds. Although described in a batch request fashion, the claimed subject matter may also be implemented in a real-time, interactive mode.

Process 500 starts in a "Begin Search Images" block 502 and proceeds immediately to a "Receive Request" block 504. During processing associated with block 504, a request from a user on computing system 102 is received at IFSE 128. During processing associated with a "Select Criterion" block 506, one of the criterion specified by the user is selected. During processing associated with a "Score Images" block 508, the available images, which in this example are in image repository 126 (FIG. 1), are scored based upon the criterion selected during processing associated with block 506, adjusting for the corresponding, assigned weight (see 144 and 146, FIG. 2). During processing associated with a "More Criteria?" block 510, a determination is made as to whether or not there have been additional, unscored criterion specified by the user. If so, control returns to block 506, the next, unprocessed criterion is selected and processing continues as described above.

If, during processing associated with block 510, a determination is made that the there are no unprocessed criterion, control proceeds to a "Compile Scores" block 512. During processing associated with block 512, the scores generated through the iterations of blocks 506, 508 and 510 are compiled and a total score for each processed image is produced (see 146, FIG. 2). During processing associated with a "Select Images" block 514, images that have exceed a threshold value with respect to their respective scores are selected to be returned to computing system 102 (see 148, FIG. 2). During processing associated with a "Transmit Images" block 516, the images selected during processing associated with block 514 are transmitted to computing system 102 for display in a result screen such as result screens 200 (FIG. 4), 300 (FIG. 5) and 400 (FIG. 6). Finally, control proceeds to an "End Search Images" block 519 during which process 500 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

I claim:

1. An apparatus, comprising:
   a plurality of processors;
   a non-transitory, computer-readable storage medium coupled to the plurality of processors; and
   logic, stored on the computer-readable storage medium and executed on the plurality of processors, for:
   selecting an image for comparison with a plurality of images;
   designating a first contiguous area within the image;
   specifying a first visual criterion corresponding to the first contiguous area for searching the plurality of images, wherein the first visual criterion is based upon a first visual similarity between the image and the plurality of images;
   designating a second contiguous area within the image;
   specifying a second visual criterion corresponding to the second contiguous area for searching the plurality of images, wherein the second visual criterion is based upon a second visual similarity between the image and the plurality of images, wherein the second visual criteria is different than the first visual criteria;
   assigning, to each of the first and second visual criterion, a first and second weight, respectively, such that each visual criteria is weighted in proportion to the corresponding first and second weight; and scoring each of the plurality of images based upon the first and second visual criteria and the first and second weights;

selecting a subset of the plurality of images that meet a first threshold with respect to the scoring; and providing a graphical user interface (GUI) to enable the selecting of the image, specifying and displaying the subset of the plurality of images, selecting the subset and displaying of the subset of the plurality of images.

2. The apparatus of claim 1, the logic further comprising logic for providing, in the graphical user interface, a first control corresponding to the first weight and a second control corresponding to the second weight, wherein the first and second controls enable adjustment of the first and second weights, respectively.

3. The apparatus of claim 1, the logic further comprising logic for:

selecting a second image of the subset of the plurality of images;

specifying a third visual criterion corresponding to the third contiguous area within the second image for searching the plurality of images, wherein the third visual criterion is based upon a third visual similarity between the second image and the plurality of images, wherein the third visual criteria is different than the first and second visual criteria;

searching the plurality of images based upon the third visual criteria to select a second subset of the plurality of images that meet a third threshold with respect to the third visual similarities;

displaying the second subset of the plurality of images.

4. A computer programming product, comprising:

a non-transitory, computer-readable storage medium; and logic, stored on the computer-readable storage medium for execution on the plurality of processors, for:

selecting an image for comparison with a plurality of images;

designating a first contiguous area within the image;

specifying a first visual criterion corresponding to the first contiguous area for searching the plurality of images, wherein the first visual criterion is based upon a first visual similarity between the image and the plurality of images;

designating a second contiguous area within the image;

specifying a second visual criterion corresponding to the second contiguous area for searching the plurality of images, wherein the second visual criterion is based upon a second visual similarity between the image and the plurality of images, wherein the second visual criteria is different than the first visual criteria;

assigning, to each of the first and second visual criterion, a first and second weight, respectively, such that each visual criteria is weighted in proportion to the corresponding first and second weight;

scoring each of the plurality of images based upon the first and second visual criteria and the first and second weights;

selecting a subset of the plurality of images that meet a first threshold with respect to the scoring; and providing a graphical user interface (GUI) to enable the selecting of the image, specifying and displaying the subset of the plurality of images, selecting the subset and displaying of the subset of the plurality of images.

5. The computer programming product of claim 4, the logic further comprising logic for providing, in the graphical user interface, a first control corresponding to the first weight and a second control corresponding to the second weight, wherein the first and second controls enable adjustment of the first and second weights, respectively.

6. The apparatus of claim 1, wherein the visual similarity is selected from a group, the group consisting of:
a composition of the image;
a color of the image;
a luminosity of the image; and
a shape of an element within the image.

7. The computer programming product of claim 4, wherein the visual similarity is selected form a group, the group consisting of:
a composition of the image;
a color of the image;
a luminosity of the image; and
a shape of an element within the image.

8. The computer programming product of claim 4, the logic further comprising logic for:

selecting a second image of the subset of the plurality of images;

specifying a third visual criterion corresponding to the third contiguous area within the second image for searching the plurality of images, wherein the third visual criterion is based upon a third visual similarity between the second image and the plurality of images, wherein the third visual criteria is different than the first and second visual criteria;

searching the plurality of images based upon the third visual criteria to select a second subset of the plurality of images that meet a third threshold with respect to the third visual similarities;

displaying the second subset of the plurality of images.

9. The apparatus of claim 1, further comprising:
specifying a degree of match with respect to the first visual criterion; and
scoring each of the plurality of images based upon the degree of match in addition to the first and second visual criteria and the first and second weights.

10. The apparatus of claim 1, the logic further comprising logic for:
specifying a degree of match with respect to the first visual criterion; and
scoring each of the plurality of images based upon the degree of match in addition to the first and second visual criteria and the first and second weights.

* * * * *